Aug. 19, 1952     C. E. PETERS     2,607,832
DEVICES WHICH HAVE SELENIUM AS CONSTITUENT PARTS THEREOF
Filed July 19, 1947
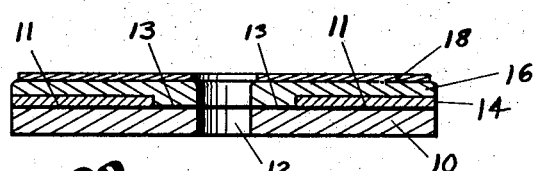
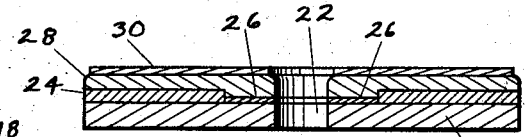
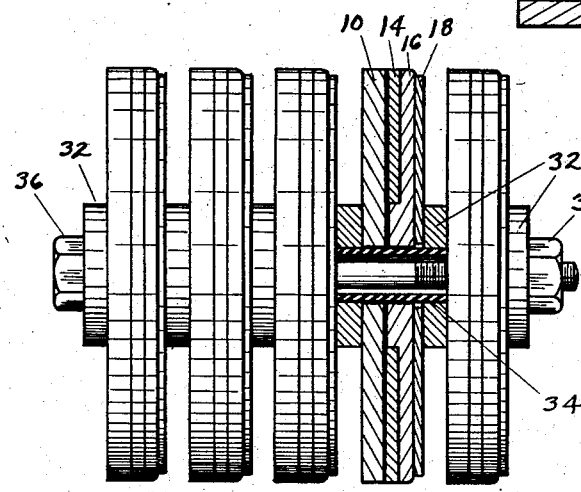
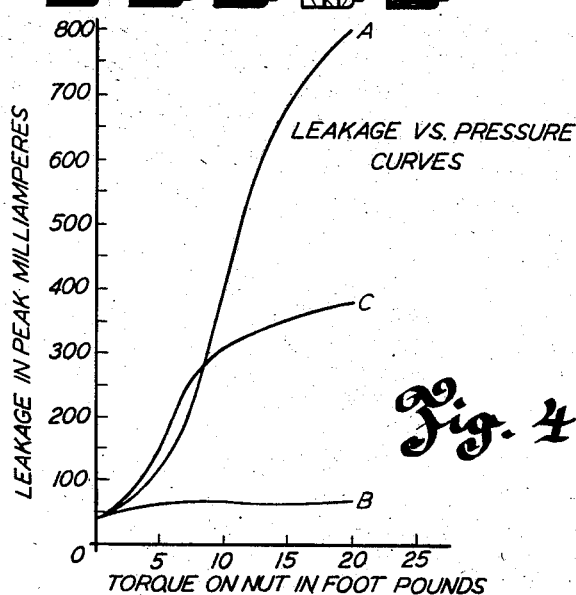
INVENTOR
CARL E. PETERS
BY
Roy M. Eilers
ATTORNEY Patented Aug. 19, 1952

2,607,832

UNITED STATES PATENT OFFICE 2,607,832

DEVICES WHICH HAVE SELENIUM AS CONSTITUENT PARTS THEREOF

Carl E. Peters, University City, Mo., assignor to Vickers, Incorporated, a corporation of Michigan Application July 19, 1947, Serial No. 762,193

16 Claims. (Cl. 175—366)

This invention relates to improvements in devices which have selenium as constituent parts thereof. More particularly this invention relates to methods and apparatus for making improved devices which have selenium as constituent parts thereof.

It is therefore an object of the present invention to provide an improved method of making devices which have selenium as constituent parts thereof.

In the making of devices which have selenium as constituent parts thereof, and more particularly in the making of selenium rectifiers, it is customary to prepare a selenium-coated base plate and then form a counterelectrode on the surface of the selenium coating. According to generally accepted theory, a "blocking layer" forms or is formed on the surface of the selenium coating of the base plate, and that "blocking layer" provides desirable asymmetrical electrical properties for the rectifier. The counterelectrode and the base plate, which are formed of metal and which are resistive to wear and pressure, serve as the electrical contacts for the relatively fragile "blocking layer." The resulting structure is referred to as a rectifying couple, and that couple can readily pass current in one direction and can strongly resist the flow of current in the opposite direction. These rectifying couples may be used individually, but it is customary to assemble a number of rectifying couples together to form a rectifier stack of the desired electrical capacity. Once assembled as a rectifier stack, the rectifying couples must be held in good electrical contact with each other to minimize contact resistance between adjacent rectifying couples. The various rectifying couples of a rectifier stack are usually held in assembled relation by means of a bolt that extends through openings in the centers of the rectifying couples and by a nut that is threaded onto the end of the bolt; and proper rotation of the bolt relative to the nut creates sufficient pressure on adjacent retcifying couples to hold them in intimate electrical and physical contact. In this way it is possible to assure low contact resistance between adjacent rectifying couples in the rectifier stack, thus providing a rectifier unit of high efficiency.

Once the proper setting of the nut and bolt of the rectifier stack has been attained, that setting is not disturbed. However, even though the initial setting of the nut and bolt of the rectifier stack is not disturbed, the forces and pressures exerted on the individual rectifying couples will experience considerable changes as the rectifier stack heats and cools. This is due to the fact that the thermal coefficient of expansion of the bolt is not exactly the same as the thermal coefficients of expansion of the selenium coating or the base plate or the counterelectrode. In some instances the difference between the thermal coefficient of expansion of the bolt and the thermal coefficients of expansion of the selenium coating or the base plate or the counterelectrode is so great, and the overall length of the rectifier stack is so great, that the heat which is generated during the operation of the rectifier stack will cause the rectifying elements to expand and create forces and pressures sufficiently large to press portions of the counterelectrode into the selenium coating, thus impairing or destroying the "blocking layer." Where this occurs, the electrical efficiency of the rectifier stack is seriously reduced. In the absence of some device that can absorb, or minimize the effects of, the expansion which occurs during operation of the rectifier stack, the "blocking layers" of the rectifying couples can be impaired or destroyed; particularly where the initial forces and pressures on the rectifying couples are high, as they must be to maintain low contact resistance between adjacent rectifying couples.

Efforts have been made to avoid the impairment or destruction of the "blocking layers" of rectifying couples in rectifier stacks, despite the expansion of those couples; and one of those efforts included the formation of each counterelectrode in such a way that a part of the selenium coating is bare, placing a washer of insulating material against the bare part of the selenium coating, and providing a metal spring washer that bears against the counterelectrode of the rectifying couple and against the washer of insulating material. The washer of insulating material acts to space adjacent rectifying couples apart, and the metal spring washer provides electrical contact between the counterelectrode of one rectifying couple and the base plate of an adjacent rectifying couple. With such a construction, expansion of the rectifying couples cannot force portions of the counterelectrode into the selenium coating and impair the "blocking layer" of any of the rectifying couples; because the washer of insulating material bears the load and the counterelectrode is not subjected to excessive forces and pressures. In the event the washer of insulating material is pressed into the surface of the selenium coating, no impairment of the electrical efficiency of the rectifying couple will result since the washer can not conduct current to that portion of the selenium coating. Where rectifying couples are made and equipped in this manner, those rectifying couples can be assembled to form rectifier stacks that expand and contract with no appreciable decrease of efficiency. However, the metal spring washers are expensive, and their use tends to increase the labor involved in assembling the rectifier stacks. Moreover, the spring washers are preferably slotted to give them sufficient flexibility, and the slots in those washers make it difficult to paint the rectifier stacks or to coat those stacks with moisture-proofing compounds. If the paint or moisture-proofing compound is sprayed or brushed onto the rectifier stacks, the washers will keep part of the counterelectrode from being painted or coated and yet they will permit air, with its entrained moisture, to contact the counterelectrode. On the other hand, if the rectifier stacks are dipped in the paint or the moisture-proofing compound, the paint may creep under the edges of the spring metal washers and create a high contact resistance between the counterelectrode and the spring washer. The spring washers are also not completely satisfactory because they shield a large part of the counterelectrode from cooling air currents; and in some cases the counterelectrode, which may be of a low melting point metal, may melt and be forced through the "blocking layer." Furthermore, the metal spring washers are not completely satisfactory because it is difficult to secure just the required amount of spring pressure for each spring washer; since the thickness, composition and temper of the metal of those washers must be controlled within very close limits to provide any uniformity of spring pressure for the washers.

Another of the effects, to avoid impairment or destruction of the "blocking layers" of rectifying couples assembled in rectifier stacks, included the positioning of a dielectric material between those portions of the selenium coatings and those portions of the counterelectrodes which experience the greatest forces and pressures when the rectifying elements are assembled to form a rectifier stack. The dielectric material served as a cushion and insulator between certain portions of the selenium coating and certain portions of the counterelectrode; thus keeping those portions of the counterelectrode from being pressed into the surface of the selenium coating. The insertion of a dielectric material between the selenium coating and the counterelectrode avoids many of the disadvantages experienced with metal spring washers, but the insertion of the dielectric material is a time-consuming and expensive process. The insertion must be done manually, thus keeping the rectifiers from being manufactured by automatic machinery; and the insertion necessitates the provision of an additional element in the rectifying couple. Moreover, no completely satisfactory dielectric material has been found for insertion between the selenium coating and the counterelectrode; mica has too smooth a surface to facilitate its adherence to the counterelectrode, paper and fiber and "plastics" can lose their effectiveness through recurrent heating of the rectifier stacks, and varnishes and lacquers tend to soften and flow when the rectifier stacks become heated. As a result, although the inserted dielectric material may initially serve to cushion and insulate certain portions of the counterelectrode from certain portions of the selenium coating, that material cannot maintain that cushioning and insulating action. Consequently, rectifying couples which have dielectric materials inserted between the selenium coating and the counterelectrode experience an appreciable loosening of the rectifying couples in the rectifier stack, thus increasing the contact resistance between adjacent rectifying couples; or they experience a breakdown in the cushioning or insulating action of the inserted dielectric materials, thus decreasing the ability of the rectifier to resist current flow in the inverse direction. For these and other reasons prior efforts, to prevent the impairment or destruction of the electrical characteristics of rectifying couples because of the expansion of those couples, have not been satisfactory. The present invention provides a completely satisfactory method of avoiding the impairment or destruction of the electrical characteristics of rectifying couples, because of the expansion of those couples, by rendering unimportant any interaction of the compressed portions of the selenium coating and the counterelectrode. Where this is done, high pressures can be established and maintained on the rectifying couples without impairing the efficiency of the rectifier stack, even though the rectifying couples of the stack expand and contract. It is therefore an object of the present invention to provide a method of making selenium rectifying couples that renders unimportant any interaction between the compressed portions of the selenium coating and the counterelectrode.

The present invention makes unimportant any interaction between the compressed portions of the counterelectrode and the selenium coating on the base plate by permitting the portion of the base plate, underlying the compressed portions of the counterelectrode and the selenium coating, to have or retain a high contact resistance with the selenium coating. Where the base plate is made of a film-forming metal such as magnesium, aluminum, tantalum or the like, the base plate will naturally form a junction of high contact resistance with selenium; and by leaving bare the portion of the base plate, underlying the compressed portions of the counterelectrode and the selenium coating, while treating the rest of the base plate to minimize that high contact resistance, it is possible to keep variations in the electrical characteristics of the compressed portions of the counterelectrode and the selenium coating from affecting the electrical characteristics of the rectifying couple. Nothing need be added or inserted since base plates of the film-forming metals naturally have the desired properties. Moreover, the natural films on these base plates are metallic compounds which are adherent to the base plates and are but little affected by pressure or temperature. As a result, rectifying couples made with this type of base plate can be assembled in rectifier stacks without experiencing loosening of the engagement between the rectifying elements and without experiencing changes in the electrical characteristics of the rectifier stacks. It is therefore an object of the present invention to make base plates of metals which naturally form high contact resistance junctions with selenium, and to leave bare the portions of those plates which underlie the compressed portions of the selenium.

The present invention can also make unimportant the interaction between the compressed portions of the counterelectrode and the selenium coating of base plates which are not of film-forming metal; as by forming a pressure-resistant and heat-resistant metallic compound on the portions of those base plates which underlie the compressed portions of the selenium. The metallic compound will perform the same function performed by the bare portion of the film-forming metal of the base plates. In this way, the present invention can use many different metals to form base plates that avoid the difficulties experienced with prior efforts to obviate the impairment or destruction of the electrical characteristics of rectifier stacks due to the expansion of the rectifying couples of those stacks. It is therefore an object of the present invention to provide a base plate wherein the part that underlies the compressed portions of the selenium coating has a metallic compound that forms a high contact resistance junction with selenium.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purposes of illustration only and that the invention will be defined by the appended claims.

In the drawing

Fig. 1 is a cross sectional view of a rectifying couple made in accordance with the principles and teachings of the present invention, Fig. 2 is a cross sectional view of another rectifying couple made in accordance with the principles and teachings of the present invention.

Fig. 3 is a partially-sectioned, side elevational view of a rectifier stack made in accordance with the principles and teachings of the present invention, and Fig. 4 is a chart showing the electrical characteristics of rectifying couples as pressures of varying intensity are exerted on them.

Referring to the drawing in detail, the numeral 10 denotes a generally circular base plate which may be made of a film-forming metal such as magnesium, aluminum, tantalum, or the like. The base plate 10 has a centrally disposed opening 12, and the opening 12 is large enough to telescope over a tube of insulating material, such as tube 34 in Fig. 3. As it is received from the supplier the metal, from which the base plate 10 can be formed by punching, cutting, or other suitable method, will have a thin film of metallic compound on the surfaces thereof. In the case of aluminum and magnesium, the films will be predominantly oxides; and in the case of other metals, the films may or may not be predominantly oxides. In each instance, however, the film will form a high contact resistance junction with selenium. The upper surface of the base plate 10 may be brushed, scratched, etched, sandblasted, or otherwise roughened to facilitate the physical engagement between that surface and metals to be applied to that surface; but whether roughened or not, the surface of the base plate 10 will still form a film that will create a high contact resistance junction with selenium. A large portion of the surface of the base plate 10 is coated with a metal such as iron, nickel, bismuth or the like, which can form a low contact resistance junction with the metal of the base plate despite the film thereon and can also form a low contact resistance junction with selenium; and that portion of the base plate 10 is annular in form and is denoted by the numeral 11. The rest of the surface of the base plate 10 is not covered with the said metal; and that portion of the base plate 10 is also annular in form, and it is denoted by the numeral 13. The coating of said metal is denoted by the numeral 14, and it is annular in form. A layer 16 of selenium overlies and is attached to the surface 11 of base plate 10 and it also overlies and is attached to the coating 14. The junction between the selenium layer 16 and the surface 11 of base plate 10 will have a high contact resistance, while the junction between the selenium layer 16 and the metal 14 will have a low contact resistance. The layer 16 of selenium will be quite thin so current can pass through that layer, despite the electrical resistivity of selenium; but the lateral dimensions of that layer will be such that little or no current will flow laterally through the layer 16. As a result, current flow through the layer 16 of selenium will be stratified, and as a result little or no current will flow through the portion of layer 16 that overlies the portion 13 of the surface of base plate 10. The layer 16 of selenium is continuous and it extends from the outer periphery of base plate 10 to the opening 12 through that base plate. A counterelectrode 18, of Wood's metal or other low-melting point metal is formed on the layer 16 of selenium, and the counterelectrode 18 will protect the "blocking layer" that will form on the surface of the layer 16 of selenium.

The resulting structure, which is shown in cross section in Fig. 1, will operate as a rectifying couple and will readily pass current in one direction while strongly resisting the passage of current in the opposite direction. When a number of these rectifying couples are assembled in the form of a rectifier stack, as shown in Fig. 3, washers 32 are positioned between the counterelectrodes 18 and base plates 10 of adjacent rectifying couples. The washers 32, which are usually of brass or other metal with high electrical conductivity, have dimensions which correspond to the dimensions of the portions 13 of the surfaces of base plates 10. As a result, the forces and pressures exerted by the washers 32 on the rectifying couples and the forces and pressures which the rectifying couples exert on the washers 32 will be localized to areas on the rectifying couples which cannot appreciably affect the overall electrical resistance of the rectifier stack. Consequently, even if the metal of the counterelectrode 18 were to be forced into that portion of layer 16 of selenium which overlies portion 13 of base plate 10, thus changing the electrical properties of the path from the counterelectrode to that portion of layer 16, the overall electrical properties of the path from the counterelectrode 18 to portion 13 of base plate 10 will be substantially unaffected. Accordingly, considerable forces and pressures can be exerted on the rectifying couples without changing their electrical characteristics; even where those forces and pressures cause an interaction between the portions of counterelectrode 18 and layer 16 which overlie portions 13 of base plate 10.

In the rectifier stack shown in Fig. 3, the rectifying couples are mounted on a hollow tube of insulating material which is denoted by the numeral 34, and that tube will usually be of fiber. A bolt 36 passes through the center of tube 34, and that bolt is provided with a nut 38 at one end thereof. Proper rotation of the nut 38 relative to the bolt 36 will cause a tightening of the washers 32 against the rectifying couples, thus decreasing the contact resistance of the rectifier stack. In those instances where low contact resistance is desired between the rectifying couples of the rectifier stack, it is necessary that the nut 38 and the bolt 36 be drawn up tightly to create a heavy pressure on the rectifying couples and the washers 32 between those couples. Where this is done, and where the rectifier stack is subsequently heated by the rectifying action of the current passing therethrough, the rectifying couples and the washers 32 will expand and additionally increase the pressure on the counterelectrodes 18 of the rectifying couples. Those additional pressures will tend to force the metal of the counterelectrodes 18 into the surfaces of the selenium coatings 16, thus interfering with the electrical characteristics of those coatings. However, the pressures are definitely localized; and any change in the electrical characteristics of the coatings must occur within an area where such changes are unimportant. With this arrangement, increases in the pressures on the rectifying couples, consequent upon heating and expansion of the rectifying couples, will merely increase the internal strains on the rectifying couples and on the bolt 36; and the rectifying couples and the bolt will be capable of withstanding those strains. The film on the portion 13 of base plate 10 is a compound of the metal of the base plate 10 and will be tremendously strong and will be resistant to heat. As a result the increased pressures will not be able to char, crush, crumble or cause the film to flow; instead that film will resist the pressures as ably as the parts of the rectifier stack. Consequently, when the rectifier stack cools it will not experience a loosening of the rectifying couples nor will it experience a change in the contact resistance between adjacent rectifying couples.

In Fig. 2 a modified form of rectifying couple is shown. In that couple, the base plate is denoted by the numeral 20. This base plate is formed from a metal, such as steel, which does not have an initial film of resistive material, as do magnesium, aluminum, tantalum and similar metals; and it is therefore desirable to form a metallic compound on the surface of the base plate 20. That metallic compound is denoted by the numeral 26; and it may be of any suitable material. One such material is zinc selenide which has considerable compressive resistance and considerable electrical resistance. The numeral 24 denotes a coating of iron, nickel, bismuth, or other metal that adheres well to the metal of the base plate and also adheres well to selenium. A coating of selenium 28 overlies the layer 24 and the layer 26. This coating 28 of selenium will adhere well to both layers 24 and 26, but it will form a junction of low electrical resistance with coating 24 while forming a junction of high electrical resistance with coating 26. A counterelectrode 30 is provided on the surface of the selenium coating 28, and that counterelectrode may be made of Wood's metal or similar low melting point metal. The rectifying couple shown in Fig. 2 has a central opening, and that opening is denoted by the numeral 22. This rectifying couple could be substituted for any of the rectifying couples shown in the rectifier stack of Fig. 3.

As in the case of the rectifying couple shown in Fig. 1, the base plate has a coating, adjacent the center thereof, which forms a junction of high contact resistance with selenium; and that coating is a heat-resistant and pressure-resistant metallic compound. Accordingly, the pressure which can be exerted upon the rectifying couple of Fig. 2, as by heating that couple while it is held in a rectifier stack, will not affect the overall electrical characteristics of that couple. With base plates formed of some metals it will be desirable to form the metallic compound by coating a metal onto the base plate and then converting that metal to a compound which forms a high contact resistance junction with selenium, but with base plates of other metals the compound can be formed from the metal of the base plates.

Fig. 4 shows curves which indicate the effect of pressure on the amount of inverse current that passes through asymmetrical selenium rectifying couples. The current is plotted along the vertical coordinate of Fig. 4; and the torque obtained by tightening nut 38 is plotted along the horizontal coordinate of Fig. 4. Three curves are plotted on the chart of Fig. 4, and those curves indicate how the inverse or leakage current increased as the torque increased. Curve A was obtained by forming a rectifier stack from rectifying couples wherein the electrical characteristics of the couples were uniform across the entire area of those couples; and increases in leakage current were excessive as the torque increased. Curve C was obtained by forming a rectifier stack which utilized resilient washers between the rectifying couples; and while the increase in leakage current was smaller, it was still higher than desired. Curve B, which is by far the most desirable of the three curves, was obtained by using the rectifier stack shown in Fig. 3. Comparison of these three curves shows clearly that the rectifying couples shown in Figs. 1–3 maintain leakage currents at minimum levels despite variations in the pressure used on the rectifier stack.

The annular coatings of iron, nickel, bismuth, and similar material can be formed in a number of ways. One way is to form a continuous coating and then use an end mill to remove part of the coating. Another way is to mask a part of the base plate and then coat the rest of the plate by electrodepositing or spraying the metal on. Still another way is to mask part of the base plate and then expose the rest of the base plate to vapors of the metal; and this method is particularly useful with bismuth. The selenium can be applied to the base plate in any of the ways customarily used in the art, and the counterelectrode can be applied to the selenium layer in any of the ways customarily used in the art.

In forming selenium rectifiers which have dielectric material between the selenium coating and the counterelectrode, the base plate is initially treated to enable all portions of its surface to form a low contact resistance junction with selenium, the selenium coating is applied to the base plate to provide good electrical contact over the entire surface of the rectifier, and then a part of the selenium surface is covered with the dielectric material. This practice is not only objectionable because it inserts materials in the rectifier which cannot withstand heat or pressure, but it is objectionable because it employs needless steps and needless cost. It takes metals which may naturally possess the ability to form high contact resistance junctions with selenium and destroys that ability, thus necessitating the additional steps and additional cost of inserting the dielectric material. The present invention, on the other hand, utilizes that natural ability of the metal to form a high contact resistance junction with selenium; and by doing so provides a better and less expensive selenium rectifier.

Whereas the drawing and accompanying description have shown two preferred embodiments of the present invention it should be obvious to those skilled in the art that various changes may be made in the form of the invention without affecting the scope thereof.

What I claim is:

1. A rectifying couple that comprises an aluminum base plate, a film that comprises an aluminum compound and that is coextensive with said base plate, a coating on a portion of said base plate that overlies said film of aluminum compound and forms a low contact resistance junction with selenium, a coating of selenium on the said film and the said coating of said base plate, and a counterelectrode on said coating of selenium.

2. A rectifying couple that comprises a magnesium base plate, a film that comprises a magnesium compound and that is coextensive with said base plate, a coating on a portion of said base plate that overlies said film of magnesium compound and forms a low contact resistance junction with selenium, a coating of selenium on the said film and the said coating of said base plate, and a counterelectrode on said coating of selenium.

3. A rectifying couple that comprises a tantalum base plate, a film that comprises a tantalum compound and that is coextensive with said base plate, a coating on a portion of said base plate that overlies said film of tantalum compound and forms a low contact resistance junction with selenium, a coating of selenium on the said film and the coating of said base plate, and a counterelectrode on said coating of selenium.

4. A rectifying couple that comprises a base plate of film-forming metal, said base plate having a film thereon that is coextensive with said base plate, a coating on a portion of said base plate that overlies part of said film and that forms a low contact resistance junction with the metal of said base plate and with selenium, a coating of selenium on the said film and the said coating on said base plate, and a counterelectrode on said coating of selenium.

5. A rectifying couple that comprises a base plate of film-forming metal, said base plate having a film thereon that is coextensive with said base plate, a coating on one portion of said base plate that overlies part of said film and that is capable of forming a low contact resistance junction with the metal of said base plate and with selenium, a layer of selenium on the said film and the said coating of said base plate, and a counterelectrode on said layer of selenium, said coating being of nickel, iron, bismuth or the like.

6. A rectifying couple that comprises a film-forming base plate which has a film thereon that is capable of forming a high contact resistance junction with selenium and has a coating that overlies part of said film and is capable of forming a low contact resistance junction with selenium, a coating of selenium on said film and coating of said base plate, and a counterelectrode on said coating of selenium, said first coating being of nickel, iron, bismuth, or the like.

7. A rectifying couple that comprises a base plate, a layer of selenium adherent to and supported by said base plate, and a counterelectrode on said layer of selenium, said base plate having a surface that is capable of coacting with selenium to form a low contact resistance junction and and having a second surface that is capable of coacting with selenium to form a high contact resistance junction, said base plate being of a film-forming metal, the second said surface of said base plate being film-formed on said film-forming base plate, the first said surface of said base plate containing nickel, iron, bismuth or the like, said first surface of said base plate overlying part of said second surface on said film-forming base plate and underlying part of said layer of selenium.

8. A rectifying couple that comprises a base plate, a layer of selenium adherent to and supported by said base plate, and a counterelectrode on said layer of selenium, said base plate having a surface that is capable of coating with selenium to form a low contact resistance junction and having a second surface that is capable of coacting with selenium to form a high contact resistance junction, said base plate being of a film-forming metal, the second said surface of said film-forming base plate being film formed on said base plate, the first said surface of said base plate containing a metal, said first surface of said base plate overlying part of the second said surface on said film-forming base plate and underlying part of said layer of selenium.

9. A rectifying couple that comprises a base plate, a layer of selenium adherent to and supported by said base plate, and a counterelectrode on said layer of selenium, said base plate having a surface that is capable of coacting with selenium to form a low contact resistance junction and having a second surface that is capable of coacting with selenium to form a high contact resistance junction, said base plate having a metallic compound thereon which has metal of said base plate as the metallic component thereof, the said second surface of said base plate being a part of said metallic compound, said first surface of said base plate overlying said metallic compound.

10. A rectifying couple that comprises a base plate, a layer of selenium adherent to and supported by said base plate, and a counterelectrode on said layer of selenium, said base plate having a surface that is capable of coacting with selenium to form a low contact resistance junction and having a second surface that is capable of coacting with selenium to form a high contact resistance junction, said second surface being zinc selenide, said first and second surfaces of said base plate underlying said layer of selenium.

11. A rectifying couple that comprises a base plate, a layer of selenium adherent to and supported by said base plate, and a counterelectrode on said layer of selenium, said base plate having a surface that is capable of coacting with selenium to form a low contact resistance junction and having a second surface that is capable of coacting with selenium to form a high contact resistance junction, said first surface containing nickel, iron, bismuth or the like, said second surface being zinc selenide, said first and second surfaces of said base plate underlying said layer of selenium.

12. The method of making a rectifying couple that comprises selecting a plate of film-forming metal that naturally has a film thereon which is capable of forming a high contact resistance junction with selenium, selecting a metal that is capable of forming a low contact resistance junction with selenium, affixing said second metal to a portion of said plate and having the rest of said plate exposed, coating said exposed part of said plate and coating said second metal with selenium, and forming a counterelectrode on said selenium.

13. The method of making a rectifying couple that comprises selecting a base plate, applying to one portion of said base a metal that is capable of coacting with selenium to form a low contact resistance junction, applying to another portion of said base plate a metallic compound that is capable of forming a high contact resistance junction with selenium, forming a coating of selenium on said metal and on said metallic compound, and forming a counterelectrode on said selenium, said metal and said metallic compound underlying said coating of selenium.

14. A rectifying couple that comprises a base plate, a layer of selenium adherent to and supported by said base plate, and a counterelectrode on said layer of selenium, said base plate having a film-formed surface thereon which is a metallic compound and which can conduct current and which forms a high contact resistance junction with selenium, said base plate having another surface thereon that is a metal and coacts with selenium to form a low contact resistance junction, said first and second surfaces of said base plate underlying said layer of selenium.

15. A rectifying couple that comprises a base plate, a layer of selenium adherent to and supported by said base plate, and a counterelectrode on said layer of selenium, said base plate having a surface that contains a metal and that coacts with selenium to form a low contact resistance junction and having a second surface that is a metallic compound and that conducts current and that coacts with selenium to form a high contact resistance junction, the metal in said metallic compound of said second surface being different from said metal in the first said surface of said base plate, said first and second surfaces of said base plate underlying said layer of selenium.

16. A rectifying couple that comprises a base plate, a layer of selenium adherent to and supported by said base plate, and a counterelectrode on said layer of selenium, said base plate having a surface that is capable of coacting with selenium to form a low contact resistance junction and having a second surface that is capable of coacting with selenium to form a high contact resistance junction, said base plate being of aluminum, the said second surface of said base plate being an aluminum compound, said first mentioned surface of said base plate overlying a part of said aluminum compound, said first mentioned surface containing nickel, iron, bismuth or the like.

CARL E. PETERS.

REFERENCES CITED

The following references are of record in the file of this patent:

UNITED STATES PATENTS

| Number | Name | Date |
|---|---|---|
| 2,088,949 | Fekete | Feb. 3, 1937 |
| 2,174,840 | Robinson et al. | Oct. 3, 1939 |
| 2,188,079 | Gottschalk et al. | Jan. 23, 1940 |
| 2,221,596 | Lorenz | Nov. 12, 1940 |
| 2,221,614 | Siebert | Nov. 12, 1940 |
| 2,303,522 | Addink et al. | Dec. 1, 1942 |
| 2,328,440 | Esseling et al. | Aug. 31, 1943 |
| 2,361,969 | Saslow | Nov. 7, 1944 |